Dec. 18, 1962  H. COUNTS  3,068,608
ANIMAL TRAPS
Filed April 3, 1961
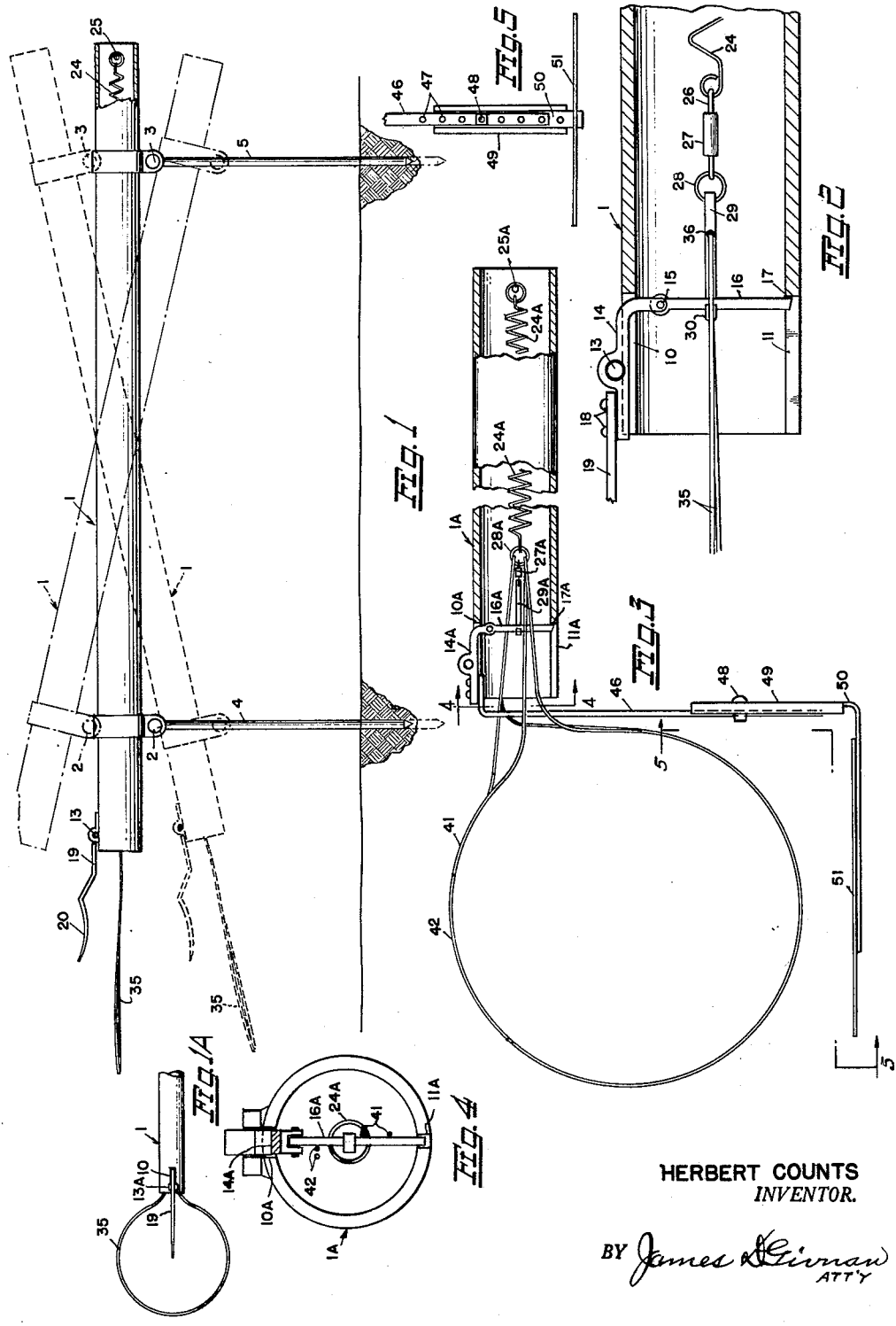
HERBERT COUNTS
*INVENTOR.*
BY James L. Girman
ATT'Y

United States Patent Office 3,068,608
Patented Dec. 18, 1962

3,068,608
ANIMAL TRAPS
Herbert Counts, Keasey Rte., Box 64, Vernonia, Oreg.
Filed Apr. 3, 1961, Ser. No. 100,383
1 Claim. (Cl. 43—87)

This invention relates to animal traps particularly adapted, though not restrictively so, for use in trapping small fur-bearing animals.

It is one of the principal objects of the invention to provide a trap of a slip noose type which is of lightweight durable construction, readily portable in quantities for distribution or placement along a trap line and one which can be conveniently set and so positioned as to arrange a bait-loaded trigger-actuating means in any desired elevation relative to the ground or runway.

Another object of the invention is to provide a trap of the character described which when sprung is instantaneously effective in killing a trapped animal without body mutilation or damage to the pelt.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of a trap made in accordance with my invention.

FIGURE 1A is a fragmentary top plan view of FIGURE 1 on a reduced scale.

FIGURE 2 is a fragmentary sectional side elevational detail view of FIGURE 1 on an enlarged scale.

FIGURE 3 is a view similar to FIGURE 2 showing a modified form of the invention.

FIGURE 4 is a sectional and elevational view on an enlarged scale taken approximately along the line 4—4 of FIGURE 3.

FIGURE 5 is a fragmentary front elevational view taken approximately along the line 5—5 of FIGURE 3.

With continuing reference to the drawing and particularly FIGURES 1 and 2 thereof reference numeral 1 indicates the main body of the trap which is in the form of an elongated hollow tube or pipe open at both of its ends and pivotally supported as at 2 and 3 upon stakes 4 and 5 adapted to be selectively driven into the ground to any desired depth.

The forward end of the pipe 1 is provided with diametrically opposed inwardly extending upper and lower slots 10 and 11. Pivotally mounted within the upper slot 10 by means of a pin 13 extending thereacross and carried by a pair of lugs 13A is a rocker arm 14 turned inwardly into the pipe at its inner end and pivotally attached as at 15 to a trigger arm 16 whose bottom end engages as at 17 with the inner end of the bottom slot 11 when the trap is set.

Secured as at 18 to the forward end of the rocker arm 14 is the rearward end of a bait carrier 19 whose forward end is somewhat hook-shaped as at 20 to which any suitable bait may be attached.

A tension spring 24 is secured at its rearward end as at 25 (FIG. 1) to the interior of the rearward end of the pipe 1 and its forward end is in hooked engagement with one end 26 of a swivel 27 whose opposite end is provided with a ring 28 to which is attached one end of a link 29 whose opposite end is in hooked engagement as at 30 with the trigger arm 16.

A slip-noose snare in the form of a wire loop 35 is connected at its inner end as at 36 to the link 29 intermediate the ends thereof and extends outwardly from the forward end of the pipe 1 a distance sufficient to form a loop as shown and in such a manner that the end 20 of the bait carrier 19 is substantially centered relative to the loop.

In the modified form of the invention shown in FIGURE 3 the pipe 1A is provided with top and bottom slots 10A and 11A, rocker arm 14A, trigger arm 16A, link 29A, swivel 27A, and ring 28A in the same manner as the first form of the invention.

The tension spring 24A is secured to the rearward end of the pipe as at 25A and its forward end is connected by the ring 28A to the inner ends of two substantially matching loops 41 and 42 of a double slip-nose snare preferably arranged in a vertical plane as shown.

The forward end of the rocker arm 14A is provided with a downwardly extending arm 46 apertured as at 47 at its bottom end for adjustable attachment by means of a bolt 48 to the correspondingly apertured web of a channel member 49 to whose bottom portion is similarly adjustably attached an arm 50 whose bottom end is turned at right angles and secured to a bait-carrying platform 51.

The single loop 35 in FIGURE 1 and the two loops 41 and 42 of FIGURE 3 are made of wire capable of retaining their looped formation but yet flexible enough to quickly collapse and straighten out as the loops are pulled into the forward end of the pipes 1 or 1A when the traps are sprung.

By means of the pivotal connection of the legs 4 and 5 to the pipe 1 of FIGURE 1, the pipe may be arranged either parallel to the ground as shown in full lines or tilted and held in any forwardly or rearwardly inclined position, as shown respectively by dotted and broken lines, relative to the ground to lower or raise the loop 35 and the bait carrier 19 relative to the ground or runway.

In the form of the invention shown in FIGURE 3 the platform 51 may be similarly raised or lowered relative to the ground or a runway by its adjustable engagement with the arm 46.

The trap as shown in FIGURE 1 and as best illustrated in FIGURE 2 is set to be sprung when an animal raises his head through the loop 35 as he partakes of the bait and pulls downwardly on the bait carrier 19. Such downward movement of the carrier at the forward end of the rocker arm 14 will swing the rearward end thereof upwardly and thereby disengage the trigger arm 16 from the inner end 17 of the slot 11. Instantaneously, upon such release of the trigger arm, the spring 24 through the medium of the link 29 will pull the loop 35 to the interior of the pipe and in so doing will instantly kill an animal trapped within the now contracted loop by strangulation or perhaps by decapitation if the loop is made of small gauge wire.

The operation of the modified form of the invention shown in FIGURE 3 is similar to the first form in that downward movement of the arm 46 by the weight of an animal on the platform 51 as it approaches the bait carried thereby will rock the rearward end of the rocker arm 14A upwardly to disengage the trigger arm 16A from the inner end 17A of the slot 11A whereupon the spring 24A will pull both loops 41 and 42 into the pipe 1A.

After either trap has been sprung the forward end of the loop 35 or loops 41 and 42 when collapsed will stop just inside the forward end of their respective pipes and within convenient reach of a finger of an operator or a hook (not shown) to pull the loops forwardly to re-set the trap. In so doing the trigger arms 16 or 16A will gravitate into reengagement with their respective slots 11 and 11A to resist the rearward pull of their respective springs 24 and 24A as the links 29 or 29A are brought into engagement with the trigger arms.

While I have shown particular forms of embodiment of my invention, I am aware that many minor changes therein will readily suggest themselves to others skilled in the art without departing from the spirit and scope of the invention. Having thus described my invention what I claim as new and desire to protect by Letters Patent is:

An animal trap of the class described comprising in combination an elongated hollow tubular body member open at at least one of its ends and having diametrically opposed inwardly extending upper and lower slots in that end, a rocker arm pivotally attached to the body member above said upper slot, a trigger arm pivotally attached to one end of said rocker arm and engageable with said lower slot, a vertical arm secured to the opposite end of said rocker arm and extending downwardly therefrom, a platform vertically adjustably secured to said vertical arm and adapted for placement over an animal runway, a link engaged at one of its ends with said trigger arms, a tension spring secured at one of its ends to the opposite end of said link and the opposite end of said spring secured to the opposite end of said body member on the interior thereof, a pair of flexible snares attached to said link, extending outwardly from said one end of the body member and arranged in substantial loop form in a vertical plane above said platform when the trap is set whereby upward tilting of the rearward end of said rocker arm by downward movement of said vertical arm by the weight of an animal imposed upon said platform will disengage said trigger from said lower slot to thereby release said spring and said link to thereby snap both of said snares to the interior of said body member to entrap an animal within the confines of said snares.

References Cited in the file of this patent

UNITED STATES PATENTS

| | | |
|---|---|---|
| 1,958,548 | Phillips | May 15, 1934 |
| 2,479,196 | Anderson | Aug. 16, 1949 |
| 2,713,741 | Gnagy | July 26, 1955 |